(12) United States Patent
Yuasa (10) Patent No.: US 9,703,097 B2
(45) Date of Patent: Jul. 11, 2017

(54) LIGHT SCANNING DEVICE THAT ENSURES IMPROVED OPTICAL PERFORMANCE OF OPTICAL IMAGE FORMED ON SCANNED SURFACE AND IMAGE FORMING APPARATUS INCLUDING THE SAME

(71) Applicant: KYOCERA Document Solutions Inc., Osaka (JP)

(72) Inventor: Yuzuru Yuasa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/189,762

(22) Filed: Jun. 22, 2016

(65) Prior Publication Data

US 2017/0003501 A1    Jan. 5, 2017

(30) Foreign Application Priority Data

Jun. 30, 2015 (JP) ................. 2015-131152

(51) Int. Cl.
| | | |
|---|---|---|
| G03G 15/04 | (2006.01) | |
| G02B 26/12 | (2006.01) | |
| B41J 2/47 | (2006.01) | |
| G03G 15/043 | (2006.01) | |

(52) U.S. Cl.
CPC ............ *G02B 26/123* (2013.01); *B41J 2/471* (2013.01); *G02B 26/124* (2013.01); *G02B 26/125* (2013.01); *G03G 15/043* (2013.01)

(58) Field of Classification Search
CPC ................... G03G 15/0409–15/0435
See application file for complete search history.

(56) References Cited

U.S. PATENT DOCUMENTS

| | | | |
|---|---|---|---|
| 2008/0130078 A1 | 6/2008 | Okuwaki et al. ............. 359/204 |
| 2009/0092417 A1* | 4/2009 | Shimomura ......... G03G 15/011 399/223 |

(Continued)

FOREIGN PATENT DOCUMENTS

| | | |
|---|---|---|
| JP | 2008-122706 A | 5/2006 |
| JP | 2008-102291 A | 5/2008 |

OTHER PUBLICATIONS

Extended European Search Report dated May 9, 2017, issued by the European Patent Office in corresponding application EP 16176380.0.

*Primary Examiner* — Clayton E Laballe
*Assistant Examiner* — Ruifeng Pu
(74) *Attorney, Agent, or Firm* — Stein IP, LLC (57) ABSTRACT

A light scanning device includes a polygon mirror, a first incidence optical system, a second incidence optical system, a first scanning lens, and a second scanning lens. The polygon mirror includes a deflection surface ensuring entering of the first light beam and the second light beam at an identical timing. Assuming that a reflection point of a light beam on the deflection surface at time point at which the light beam reflected at the deflection surface passes through a position on an optical axis of a scanning lens, the second scanning lens is superimposed on the first scanning lens at different positions in a main-scanning direction and an optical axis direction such that a circle locus is along an offset curved line. The circle locus is a locus of a point corresponding to the reference point by the rotation of the polygon mirror.

4 Claims, 8 Drawing Sheets

(56) References Cited

U.S. PATENT DOCUMENTS

| | | | | |
|---|---|---|---|---|
| 2010/0119258 A1* | 5/2010 | Teramura | G02B 26/123 | 399/151 |
| 2010/0321461 A1* | 12/2010 | Shoji | B41J 2/473 | 347/224 |
| 2011/0002712 A1* | 1/2011 | Kudo | B41J 2/471 | 399/200 |
| 2011/0181679 A1* | 7/2011 | Arai | G02B 26/123 | 347/224 |
| 2013/0002792 A1* | 1/2013 | Sakurai | B41J 2/471 | 347/224 |
| 2013/0083380 A1* | 4/2013 | Uemura | G02B 26/12 | 359/201.2 |
| 2013/0147895 A1* | 6/2013 | Miyatake | G03G 15/04036 | 347/224 |
| 2013/0194370 A1* | 8/2013 | Sakaue | G02B 26/123 | 347/118 |
| 2013/0286141 A1* | 10/2013 | Iwamoto | G03G 15/0435 | 347/224 |
| 2014/0347430 A1* | 11/2014 | Maeda | G03G 15/043 | 347/118 |
| 2015/0261120 A1* | 9/2015 | Fujii | G03G 15/0435 | 347/133 |
| 2016/0241735 A1* | 8/2016 | Nakano | G02B 26/125 | |

\* cited by examiner

LIGHT SCANNING DEVICE THAT ENSURES IMPROVED OPTICAL PERFORMANCE OF OPTICAL IMAGE FORMED ON SCANNED SURFACE AND IMAGE FORMING APPARATUS INCLUDING THE SAME

INCORPORATION BY REFERENCE

This application is based upon, and claims the benefit of priority from, corresponding Japanese Patent Application No. 2015-131152 filed in the Japan Patent Office on Jun. 30, 2015, the entire contents of which are incorporated herein by reference.

BACKGROUND

Unless otherwise indicated herein, the description in this section is not prior art to the claims in this application and is not admitted to be prior art by inclusion in this section.

A typical light scanning device used for an image forming apparatus such as a color printer includes a plurality of light sources, a polygon mirror, and a scanning lens. The polygon mirror reflects a light beam emitted by these light sources to scan on a circumference surface of a photoreceptor drum. The scanning lens forms images of the light beam on the circumference surface. A light scanning device, in which downsize and cost saving are desired, may be constituted of one polygon mirror that is shared among light beams of four colors of Y, C, M, and Bk, or one scanning lens that constitutes scanning optical systems of the respective colors. A four-color-sharing type light scanning device employs an opposite scanning method where a light source and an incidence optical system of two colors are located at both sides across a polygon mirror. In this case, the light beams of two colors enter one deflection surface of the polygon mirror, and the light beams of the remaining two colors enter another deflection surface.

As a light scanning device of the opposite scanning method, there is proposed a light scanning device that arranges light sources, incidence optical systems, and scanning lenses of every two colors completely symmetrically across a polygon mirror. This light scanning device has the equal angle between optical axes of light beams entering a deflection surface of the polygon mirror and respective optical axes of the light beams toward a scanned surface from this deflection surface (hereinafter referred to as an "incidence opening angle" in the disclosure) in optical paths of all the four colors. However, employing this configuration requires arranging the incidence optical systems of two colors superimposed in the sub-scanning direction at the identical position. This causes a problem that significantly reduces flexibility of an arrangement of optical components. As a technique to solve this problem, there is proposed a light scanning device that arranges, in each of the oppositely placed incidence optical systems of every two colors, the incidence optical systems of one color of two colors and the other color such that the incidence opening angles are different.

SUMMARY

A light scanning device according to one aspect of the disclosure includes a first light source, a second light source, a polygon mirror, a first incidence optical system, a second incidence optical system, a first scanning lens, and a second scanning lens. The first light source emits a first light beam. The second light source emits a second light beam. The polygon mirror includes a rotation shaft and a deflection surface, the deflection surface ensuring entering of the first light beam and the second light beam at an identical timing. The polygon mirror reflects the first light beam and the second light beam to scan on a scanned surface in a main-scanning direction while rotating around the rotation shaft. The first incidence optical system causes the first light beam having a first incidence opening angle to enter the deflection surface. The second incidence optical system causes the second light beam having a second incidence opening angle to enter the deflection surface, the second incidence opening angle being different from the first incidence opening angle. The first scanning lens is located between the deflection surface and the scanned surface. The first scanning lens forms an image of the first light beam on the scanned surface. The second scanning lens forms an image of the second light beam on the scanned surface. The first scanning lens and the second scanning lens are superimposed in a sub-scanning direction. Assuming that a reflection point of a light beam on the deflection surface at time point at which the light beam reflected at the deflection surface passes through a position on an optical axis of a scanning lens in plan view of the polygon mirror along an axial direction of the rotation shaft is a reference point, the second scanning lens is superimposed on the first scanning lens at different positions in a main-scanning direction and an optical axis direction such that a circle locus is along an offset curved line. The circle locus is a locus of a point corresponding to the reference point by the rotation of the polygon mirror. The offset curved line is the circle locus shifted to a downstream side of the optical axis direction.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be located, substituted, combined, separated, and designed in a wide variety of different configurations, all of which are explicitly contemplated herein.

Figure 1:
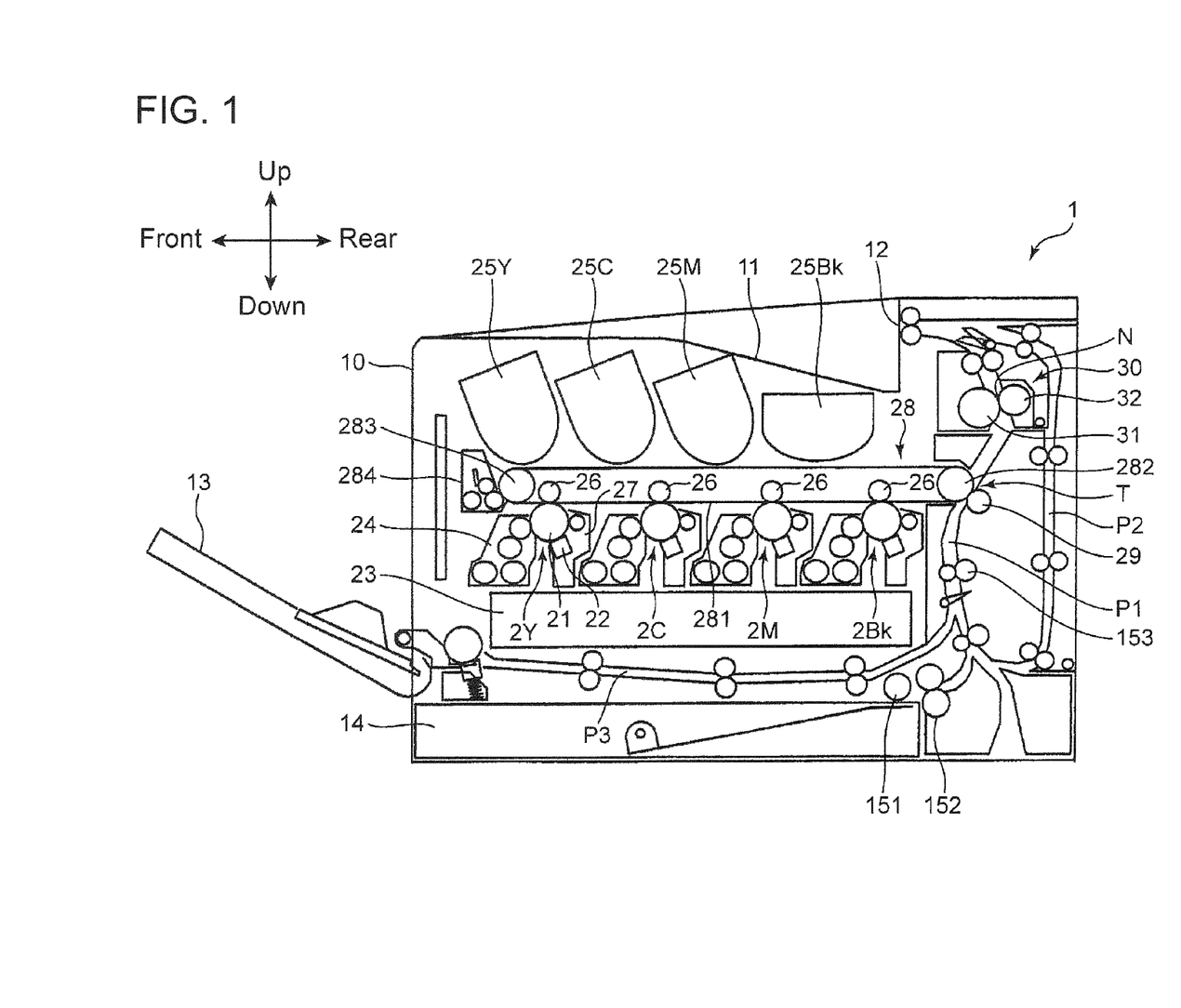
FIG. 1 illustrates a schematic configuration of an image forming apparatus according to one embodiment of the disclosure in a cross section.

The following describes the embodiment of the disclosure in detail based on the drawings. FIG. 1 illustrates a schematic cross section indicating an internal structure of an image forming apparatus 1 according to an embodiment of the disclosure. The image forming apparatus 1 is a tandem type color printer and includes a main body housing 10, which is constituted of a housing having an approximately rectangular parallelepiped shape. The image forming apparatus may be a full-color copier or a multi-functional peripheral.

The main body housing 10 internally houses a plurality of process units that execute an image formation process on sheets. The process units of the embodiment include image forming units 2Y, 2C, 2M, and 2Bk, a light scanning device 23, an intermediate transfer unit 28, and a fixing unit 30. The main body housing 10 has a top surface on which a sheet discharge tray 11 is located. Opposing the sheet discharge tray 11, a sheet discharge port 12 is opened. The main body housing 10 has a sidewall on which a bypass tray 13 is openably/closably installed. At a lower portion of the main body housing 10, a sheet feed cassette 14, which houses sheets to be processed in the image formation process, is removably installed.

The image forming units 2Y, 2C, 2M, and 2Bk form toner images of respective colors of yellow, cyan, magenta, and black based on image information transmitted from an external device, such as a computer. The image forming units 2Y, 2C, 2M, and 2Bk are located at predetermined intervals in tandem in a horizontal direction. The image forming units 2Y, 2C, 2M, and 2Bk each include a photoreceptor drum 21, a charger 22, a developing device 24, respective toner containers 25Y, 25C, 25M, or 25Bk of yellow, cyan, magenta, and black, a primary transfer roller 26, and a cleaning device 27. The photoreceptor drum 21 has a cylindrical body shape and carries an electrostatic latent image and a toner image. The charger 22 charges a circumference surface of the photoreceptor drum 21. The developing device 24 attaches a developer to the electrostatic latent image to form the toner image. The toner containers 25Y, 25C, 25M, and 25Bk of yellow, cyan, magenta, and black supply toners of the respective colors to these developing devices 24. The primary transfer roller 26 primarily transfers the toner image formed on the photoreceptor drum 21. The cleaning device 27 removes a remaining toner on the circumference surface of the photoreceptor drum 21.

The light scanning device 23 forms electrostatic latent images on the circumference surfaces of the photoreceptor drums 21 of the respective colors. The light scanning device 23 of the embodiment includes a plurality of light sources prepared for the respective colors, and an imaging optical system that forms images and scans light beams emitted from these light sources on circumference surfaces of the photoreceptor drums 21 of the respective colors. The imaging optical systems of respective colors are not mutually independent optical systems, and are partially shared. This light scanning device 23 will be described in detail later.

The intermediate transfer unit 28 primarily transfers the toner image formed on the photoreceptor drum 21. The intermediate transfer unit 28 includes a transfer belt 281, a drive roller 282, and a driven roller 283. The transfer belt 281 moves around the circumference surfaces of the respective photoreceptor drums 21 while contacting the circumference surfaces. The transfer belt 281 is looped around the drive roller 282 and the driven roller 283. The primary transfer rollers 26 cause the transfer belt 281 to press against the circumference surfaces of the respective photoreceptor drums 21. The toner images on the photoreceptor drums 21 of the respective colors are primarily transferred and superimposed on the identical position on the transfer belt 281. This forms a full-color toner image on the transfer belt 281.

A secondary transfer roller 29 is located opposed to the drive roller 282. The secondary transfer roller 29 sandwiches the transfer belt 281 to form a secondary transfer nip portion T. The full-color toner image on the transfer belt 281 is secondarily transferred onto a sheet at the secondary transfer nip portion T. A remnant toner, which has not been transferred on the sheet, on a circumference surface of the transfer belt 281 is removed by a belt cleaning apparatus 284 located opposed to the driven roller 283.

The fixing unit 30 includes a fixing roller 31, which internally includes a heat source, and a pressure roller 32, which forms a fixing nip portion N with the fixing roller 31. The fixing unit 30 heats and applies pressure to the sheet, on which the toner image has been transferred at the secondary transfer nip portion T, at the fixing nip portion N to perform a fixing process to fuse the toner onto the sheet. The sheet, on which the fixing process has been performed, is discharged toward the sheet discharge tray 11 from the sheet discharge port 12.

The main body housing 10 internally includes a sheet conveyance path to convey the sheets. The sheet conveyance path includes a main conveyance path P1 extending in a vertical direction, and is located from near a lower portion of the main body housing 10 to near an upper portion via the secondary transfer nip portion T and the fixing unit 30. The main conveyance path P1 has a downstream end that connects to the sheet discharge port 12. From the most downstream end of the main conveyance path P1 to near an upper stream end, an inverting conveyance path P2, which inverts and conveys sheets for performing a duplex printing, runs. A bypass sheet conveyance path P3 extending from the bypass tray 13 to the main conveyance path P1 is located above the sheet feed cassette 14.

The sheet feed cassette 14 includes a sheet housing portion that house a bundle of sheets. Near an upper right of the sheet feed cassette 14, a pickup roller 151 and a feed roller pair 152 are located. The pickup roller 151 feeds a sheet at the uppermost layer of a sheet bundle one by one. The feed roller pair 152 conveys the sheet to an upper stream end of the main conveyance path P1. Via the bypass sheet conveyance path P3, a sheet placed on the bypass tray 13 is conveyed to the upper stream end of the main conveyance path P1. At the further upstream side with respect to the secondary transfer nip portion T in the main conveyance path P1, a registration roller pair 153 is located to convey the sheet to a transfer nip portion at a predetermined timing.

When the single-side printing (image formation) process is performed on a sheet, the sheet is conveyed from the sheet feed cassette 14 or the bypass tray 13 to the main conveyance path P1. A transfer process of a toner image onto the sheet at the secondary transfer nip portion T and a fixing process to fix the transferred toner on the sheet at the fixing unit 30 are each performed. Then, this sheet is discharged from the sheet discharge port 12 onto the sheet discharge tray 11. On the other hand, when performing the duplex printing process on a sheet, this sheet is partially discharged from the sheet discharge port 12 onto the sheet discharge tray 11 after the transfer process and the fixing process are performed on a single-side of the sheet. Then, this sheet is reversely conveyed, and returned to near the upper stream end of the main conveyance path P1 via the inverting conveyance path P2. Subsequently, the transfer process and the fixing process are performed on the other surface of the sheet, and then this sheet is discharged from the sheet discharge port 12 onto the sheet discharge tray 11.

Figure 2:
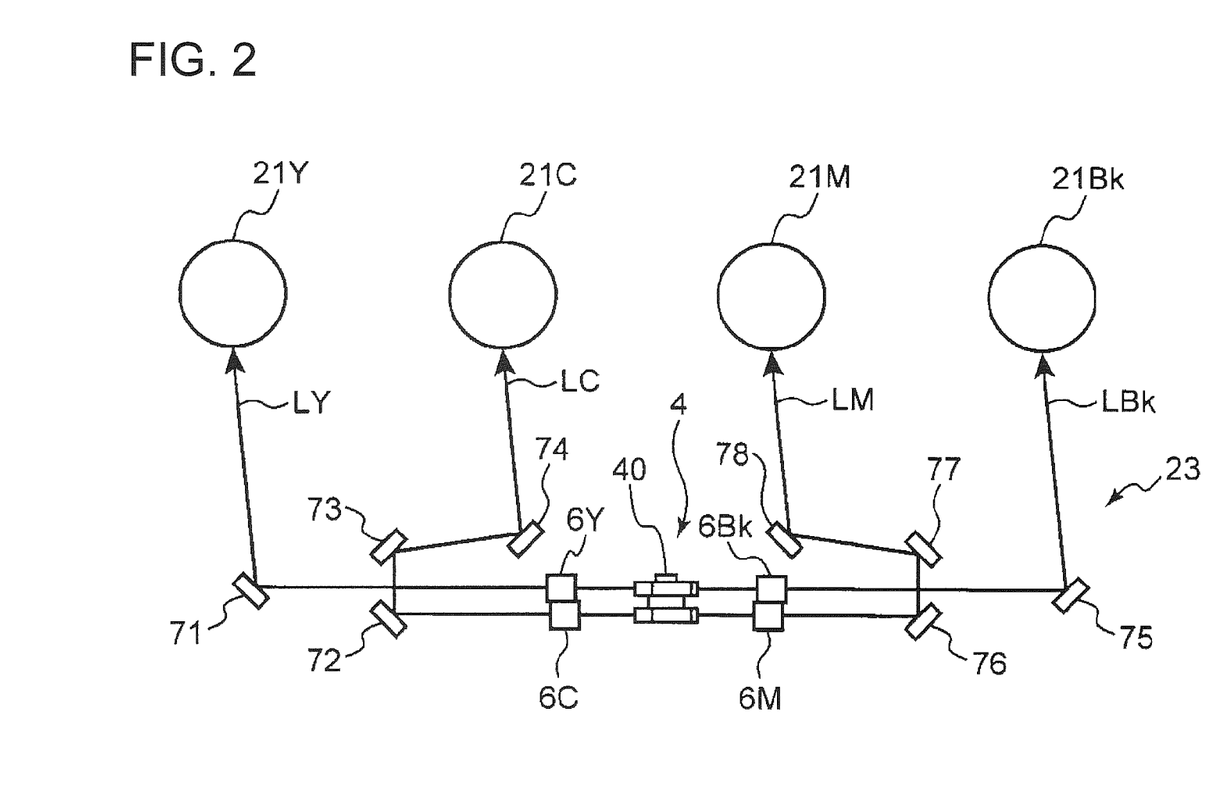
FIG. 2 illustrates an optical path diagram schematically illustrating a configuration of a sub-scanning cross section of a light scanning device according to the one embodiment.
Figure 3:
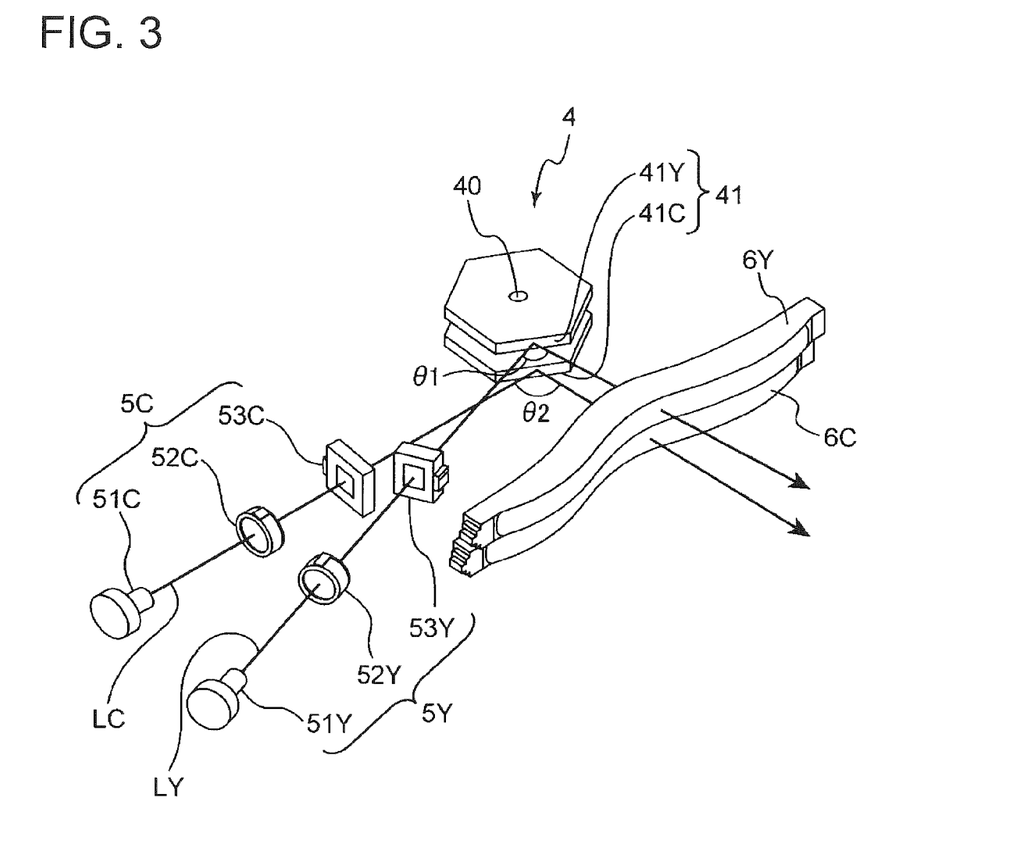
FIG. 3 obliquely illustrates a main part of the light scanning device according to the one embodiment.

Next, the following further describes the light scanning device 23 according to the embodiment in detail. FIG. 2 illustrates an optical path diagram schematically illustrating a configuration of a sub-scanning cross section of the light scanning device 23. FIG. 3 obliquely illustrates a main part of the light scanning device 23. The light scanning device 23 respectively scans a yellow light beam LY (first light beam) for drawing a yellow image, a cyan light beam LC (second light beam) for drawing a cyan image, a magenta light beam LM for drawing a magenta image, and a black light beam LBk for drawing a black image on circumference surfaces of a photoreceptor drum 21Y of yellow (scanned surface, a first image carrier), a photoreceptor drum 21C of cyan (scanned surface, a second image carrier), a photoreceptor drum 21M of magenta, and a photoreceptor drum 21Bk of black.

The light scanning device 23 includes, as a scanning optical system for the respective colors, incidence optical systems, one polygon mirror 4, scanning lenses 6Y, 6C, 6M, and 6Bk, reflection mirrors 71 to 78, and a housing (not illustrated) that houses these components. The incidence optical systems are located in respective optical paths of the light beams of the respective colors. The one polygon mirror 4 is shared among the four colors. The scanning lenses 6Y, 6C, 6M, and 6Bk are scanning lenses for the light beams of the respective colors. The reflection mirrors 71 to 78 irradiate respective circumference surfaces of the photoreceptor drums 21Y, 21C, 21M, and 21Bk with the light beams of the respective colors. In the embodiment, a scanning optical system for yellow and a scanning optical system for cyan are located opposed to a scanning optical system for magenta and a scanning optical system for black across the polygon mirror 4. That is, the light scanning device 23 of the embodiment is a device that employs an opposite scanning method. The opposite scanning method shares the one polygon mirror 4 among the two pairs of scanning optical systems for two colors, which are located opposed one another. FIG. 3 obliquely illustrates one of these two pairs of the scanning optical systems for two colors.

FIG. 3 illustrates a yellow incidence optical system 5Y (first incidence optical system) and a cyan incidence optical system 5C (second incidence optical system). The yellow incidence optical system 5Y includes a laser unit 51Y, a collimator lens 52Y, and a cylindrical lens 53Y. The laser unit 51Y includes a laser device (first light source) that emits the yellow light beam LY (laser beam), with which the circumference surface of the photoreceptor drum 21Y of yellow is irradiated. The collimator lens 52Y converts the yellow light beam LY emitted and diffused from the laser unit 51Y to a collimated light. The cylindrical lens 53Y converts the collimated light to a long-line-shaped light in the main-scanning direction to form an image of the long-line-shaped light on a deflection surface 41 of the polygon mirror 4.

The cyan incidence optical system 5C includes a laser unit 51C, which includes a laser device (second light source) for emitting the cyan light beam LC, a collimator lens 52C, which functions similarly to the above-described collimator lens 52Y, and a cylindrical lens 53C. As illustrated in FIG. 3, the yellow incidence optical system 5Y and the cyan incidence optical system 5C are located to have mutually different incidence opening angles with respect to the polygon mirror 4 (deflection surface 41). This eliminates the need for the two incidence optical systems located at the identical position in the housing, thus ensuring flexibility of positions of the optical components.

Namely, an angle between an optical axis of the yellow light beam LY entering the deflection surface 41 of the polygon mirror 4 and an optical axis of the light beam toward the scanned surface (circumference surface of the photoreceptor drum 21Y) from this deflection surface 41 is a first incidence opening angle $\theta 1$. On the other hand, an angle between an optical axis of the cyan light beam LC entering the deflection surface 41 and an optical axis of a light beam toward the scanned surface from this deflection surface 41 is a second incidence opening angle $\theta 2$, which is larger than the first incidence opening angle $\theta 1$. In the embodiment, $\theta 1$ is set to 75 degrees, and $\theta 2$ is set to 90 degrees. The first incidence opening angle $\theta 1$ is an incidence opening angle as a reference of the light scanning device 23. The optical path, the housing, the positions of the optical component, and similar matters are designed with priority on the yellow incidence optical system, which has this $\theta 1$.

Components of the magenta incidence optical system and the black incidence optical system, which are not illustrated, are identical to the above-described incidence optical system. In the embodiment, the positions of respective incidence optical systems are configured such that the black light beam LBk enters the deflection surface 41 of the polygon mirror 4 at the first incidence opening angle $\theta 1$, and the magenta light beam LM enters the deflection surface 41 at the second incidence opening angle $\theta 2$.

The polygon mirror 4 is a multifaceted mirror that includes six deflection surfaces 41 formed along respective sides of a regular hexagon. At the center position of the polygon mirror 4, a rotation shaft 40 is installed. The rotation shaft 40 connects to an output shaft of a polygon motor (not illustrated). The polygon motor rotatably drives the polygon mirror 4 to rotate around an axis of the rotation shaft 40, reflect (deflect) laser beams (light beams LY, LC, LM, and LBk) emitted from the respective incidence optical systems, and scan these laser beams on the circumference surfaces of the respective photoreceptor drums 21Y, 21C, 21M, and 21Bk.

The yellow light beam LY and the cyan light beam LC enter one deflection surface 41 of the six deflection surfaces 41 of the polygon mirror 4 at a specific scan timing. The magenta light beam LM and the black light beam LBk additionally enter another deflection surface 41 opposed to the one deflection surface 41 at the identical scan timing. As illustrated in FIG. 3, the deflection surface 41 is separated into two stages, an upper stage and a lower stage. Here, the upper stage is a deflection surface 41Y for the yellow light beam LY (also for the black light beam LBk), and the lower stage is a deflection surface 41C for the cyan light beam LC (also for the magenta light beam LM). This is a contrivance for a reduced weight of the polygon mirror 4 by removal of a middle stage portion, which is not used for actual reflection of the light beam, from a region of the deflection surface 41. Clearly, the deflection surface 41 may have a simple plane surface without a removal portion.

The scanning lenses 6Y, 6C, 6M, and 6Bk are lenses that have distortions (fθ property), which each have a proportional relationship between an angle of an incident light beam and an image height, and are long lenses in the main-scanning direction. These scanning lenses 6Y, 6C, 6M, and 6Bk condense the respective light beams LY, LC, LM, and LBk, which are reflected at the deflection surface 41 of the polygon mirror 4, to form images on the circumference surfaces of the photoreceptor drums 21Y, 21C, 21M, and 21Bk, respectively. The embodiment includes only one scanning lens having a function to form images on the drum circumferential surfaces using the respective light beams LY, LC, LM, and LBk.

That is, while FIG. 3 illustrates a part of the yellow and the cyan scanning optical systems, an optical path between the polygon mirror 4 and the photoreceptor drum 21Y of yellow includes only one scanning lens 6Y (first scanning lens), and an optical path between the polygon mirror 4 and the photoreceptor drum 21C of cyan includes only one scanning lens 6C (second scanning lens). The scanning lens 6Y forms images of the yellow light beam LY on the circumference surface of the photoreceptor drum 21Y. The scanning lens 6C forms images of the cyan light beam LC on the circumference surface of the photoreceptor drum 21C. Similarly, the scanning lens 6M forms images of the magenta light beam LM on the circumference surface of the photoreceptor drum 21M, and the scanning lens 6Bk forms images of the black light beam LBk on the circumference surface of the photoreceptor drum 21Bk. This ensures the reduced number of components in the light scanning device 23, and downsizing of the light scanning device 23.

As illustrated in FIG. 3, the scanning lens 6C for cyan and the scanning lens 6Y for yellow are located such that the scanning lens 6C for cyan and the scanning lens 6Y for yellow are superimposed in the sub-scanning direction (vertical direction). In the embodiment, the scanning lens 6Y is located at the upper stage, the scanning lens 6C is located at the lower stage, and the top surface of the scanning lens 6C contacts the bottom surface of the scanning lens 6Y.

Figure 4:
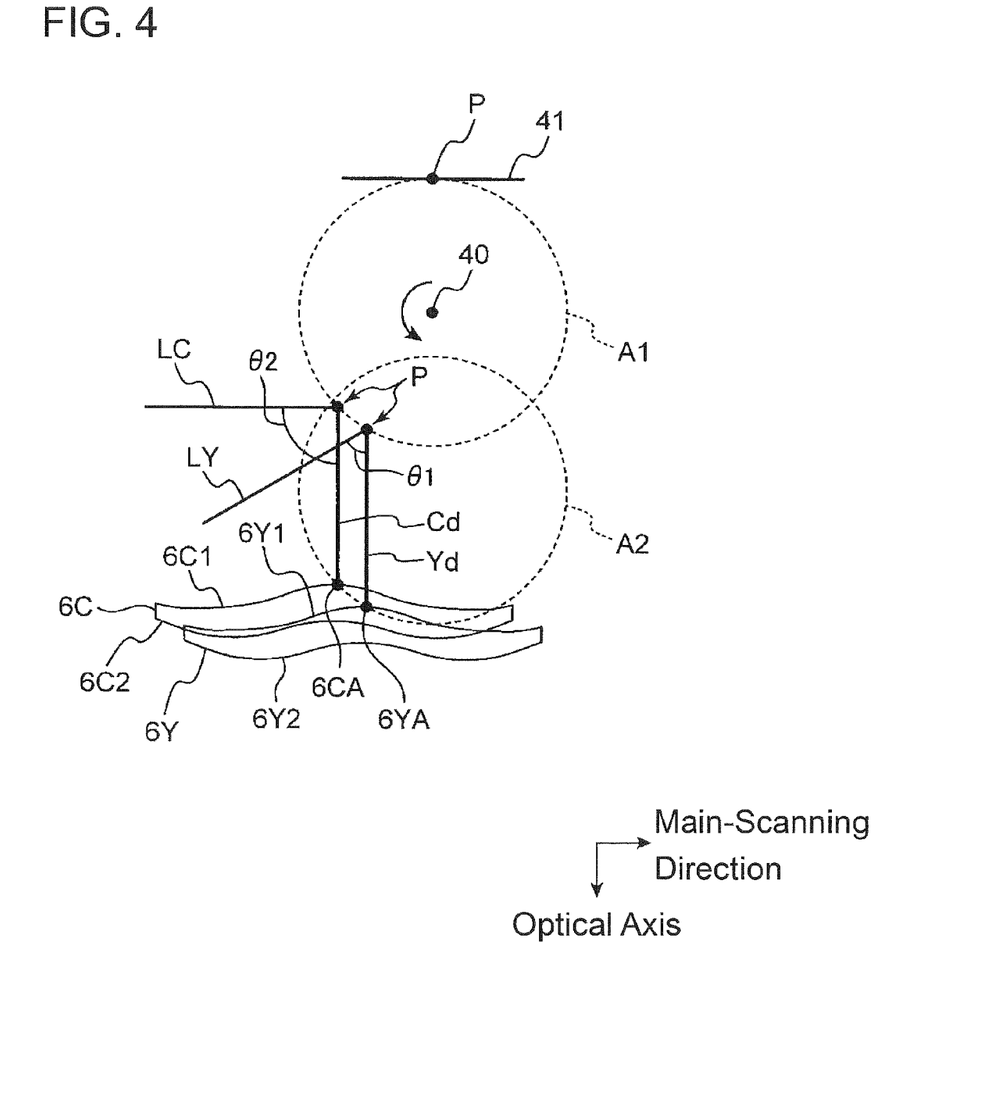
FIG. 4 illustrates a schematic diagram for describing an arrangement of a first and a second scanning lenses according to the one embodiment.
Figure 5A:
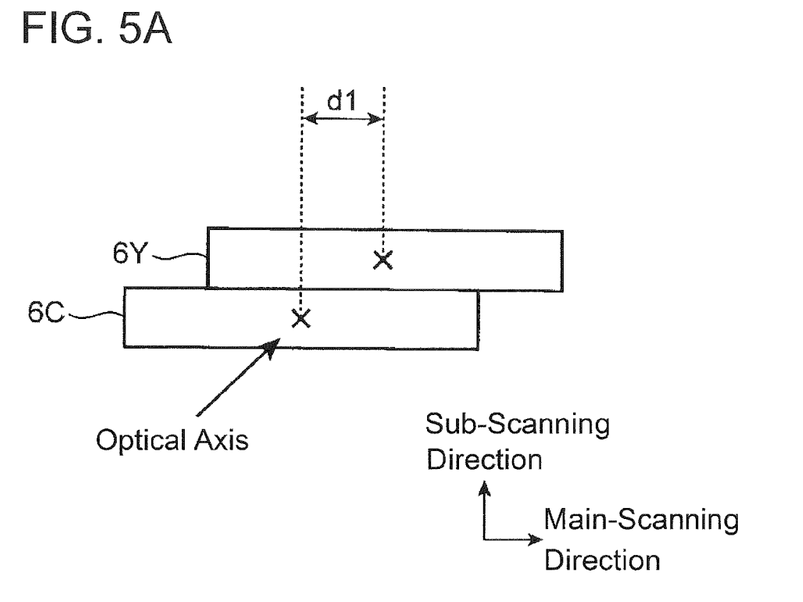
FIG. 5A illustrates an arrangement of the first and the second scanning lenses according to the one embodiment in a main-scanning cross section.
Figure 5B:
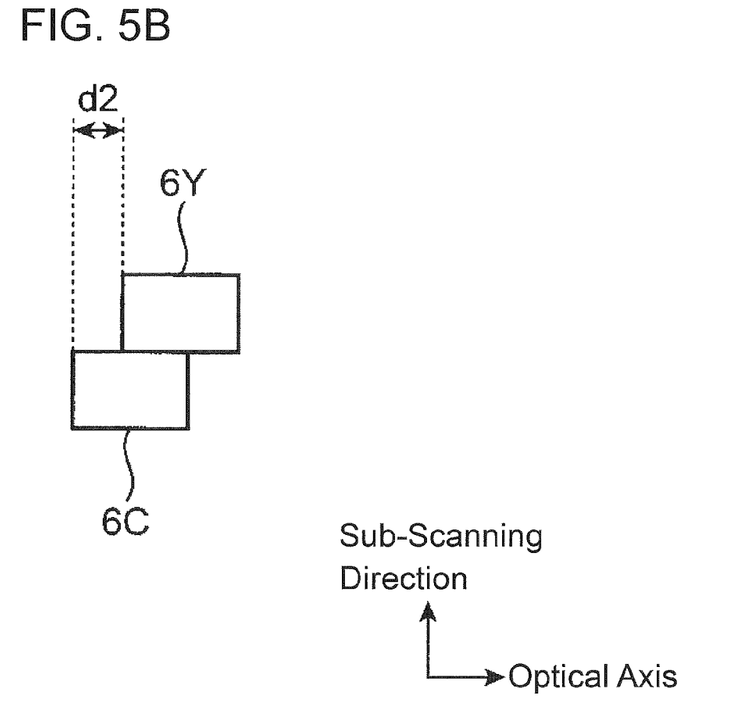
FIG. 5B illustrates positions of the first and the second scanning lenses according to the one embodiment in a sub-scanning cross section.

FIG. 4 illustrates a schematic diagram for describing positions of the scanning lenses 6Y and 6C. FIG. 5A illustrates positions of the scanning lenses 6Y and 6C in a main-scanning cross section. FIG. 5B illustrates the position of the scanning lenses 6Y and 6C in a sub-scanning cross section. The same applies to the scanning lenses 6M and 6Bk, thus drawing and description of the scanning lenses 6M and 6Bk are omitted. As illustrated in these drawings, the scanning lens 6C for cyan and the scanning lens 6Y for yellow are superimposed at different positions in the main-scanning direction and the optical axis direction.

The following describes positions of the scanning lenses 6Y and 6C in detail with reference to FIG. 4. FIG. 4 illustrates one deflection surface 41 of the polygon mirror 4 in plan view of this polygon mirror 4 along an axial direction of the rotation shaft 40 of the polygon mirror 4. FIG. 4 further illustrates a circle locus A1 drawn by rotation of a specific reflection point P on this deflection surface 41 and a point corresponding to this reflection point P around the rotation shaft 40 of the polygon mirror 4 (rotation direction is illustrated in FIG. 4 with an arrow). The reflection points P are reflection points of the yellow light beam LY and the cyan light beam LC on the deflection surface 41 when the deflection surface 41 reflects the yellow light beam LY and the cyan light beam LC to pass through positions on the optical axes of the scanning lenses 6Y and 6C, respectively. That is, the reflection point P is a reference position where the deflection surface 41 reflects the light beam, which passes through the optical axis. The reflection point P is hereinafter referred to as a reference point P.

FIG. 4 illustrates an offset curved line A2, which is the circle locus A1 shifted by a predetermined distance downstream in the optical axis direction. The scanning lens 6C is superimposed under the scanning lens 6Y at different positions in the main-scanning direction and the optical axis direction such that the scanning lens 6C is along the offset curved line A2 of the circle locus A1.

The following specifically describes the above-described scanning lens. The incidence optical system 5Y and the scanning lens 6Y for yellow are located with respect to the polygon mirror 4 such that the yellow light beam LY is reflected at a reference point P, which exists at a specific position on the deflection surface 41, and passes through the position on the optical axis of the scanning lens 6Y (first incidence opening angle $θ1=75$ degrees). The scanning lens 6Y includes an incident surface 6Y1 and an emission surface 6Y2. The yellow light beam LY reflected at the reference point P passes through an axial point 6YA (first axial point), which is located at a position on an optical axis of the incident surface 6Y1. The scanning lens 6Y is installed to the housing such that this axial point 6YA is located on the offset curved line A2. In other words, the axial point 6YA is adjusted to be located at a downstream end of an optical path Yd (first middle optical path) having a length, which is determined in design, between the polygon mirror 4 and the scanning lens 6Y in an optical path of the yellow light beam LY. Then, the circle locus A1 is virtually moved such that a point corresponding to a reflection point P (reference point of the first light beam) of the circle locus A1 is shifted to this axial point 6YA. This configures the offset curved line A2.

The incidence optical system 5C and the scanning lens 6C for cyan are also located with respect to the polygon mirror 4 such that the cyan light beam LC is reflected at a reference point P of the deflection surface 41, and passes through the position on the optical axis of the scanning lens 6C (second incidence opening angle $θ2=90$ degrees). The difference in the incidence opening angles displaces an optical path Cd (second middle optical path) between the polygon mirror 4 and the scanning lens 6C in the optical path of the cyan light beam LC to an upstream side in the rotation direction of the polygon mirror 4 with respect to the yellow optical path Yd. That is, there is a relationship where the yellow light beam LY is reflected at the reference point P at a time point (ty) at which the deflection surface 41 further rotates downstream by a predetermined rotation angle in the rotation direction, compared with the time point (tc) at which the cyan light beam LC is reflected at the reference point P. The optical path Yd and the optical path Cd have the equal length.

The scanning lens 6C includes an incident surface 6C1 and an emission surface 6C2. The cyan light beam LC reflected at the reference point P passes through an axial point 6CA (second axial point), which is located a position on an optical axis of the incident surface 6C1. This axial point 6CA is adjusted to be located at a downstream end of the optical path Cd, and the scanning lens 6C is installed to the housing at the downstream end of the optical path Cd such that the axial point 6CA is located on the offset curved line A2. Since the optical path Yd and the optical path Cd have the equal length, a positional relationship between a position of the reference point P at the time point (ty) and a position of the reference point P at the time point (tc) matches a positional relationship (relative position) between the axial point 6YA and the axial point 6CA.

As described above, the scanning lens 6Y and the scanning lens 6C are superimposed in the sub-scanning direction such that the axial point 6YA and the axial point 6CA are located at different positions on the offset curved line A2. As illustrated in FIG. 5A, the optical axis (center of the lens) of the scanning lens 6C is consequently shifted by a distance d1 in the main-scanning direction with respect to the optical axis (center of the lens) of the scanning lens 6Y. As illustrated in FIG. 5B, the scanning lens 6C is consequently located at an upstream side in the optical axis direction and displaced by a distance d2 with respect to the scanning lens 6Y. Employing such positions of the scanning lenses ensures the reduced field curvature on a scanned surface.

While it is preferred that the axial point 6CA on the scanning lens 6C be located on the offset curved line A2 as described above, the axial point 6CA may be located at a position slightly displaced from the offset curved line A2 only when a desired optical property is achievable. For example, a position of the axial point 6CA may include a displacement corresponding to an engineering tolerance in design in the main-scanning direction or the optical axis direction from the offset curved line A2.

WORKING EXAMPLE

Figure 6:
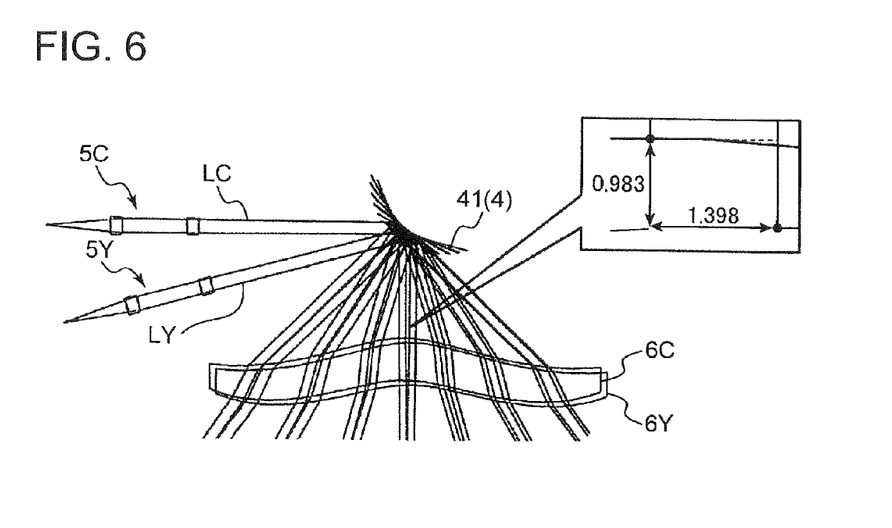
FIG. 6 illustrates a main-scanning cross section of a scanning optical system that includes an arrangement relationship between the first and second scanning lenses according to a working example of the disclosure.

Next, the following describes an exemplary scanning optical system that meets the condition of the light scanning device 23 according to the above-described embodiment. The following describes a combination of a scanning optical system for cyan and a scanning optical system for yellow. The same applies to a combination of a scanning optical system for magenta and a scanning optical system for black. The configuration of the scanning optical system described here includes, as illustrated in FIG. 6, the incidence optical systems 5Y and 5C, the one polygon mirror 4, and the scanning lenses 6Y and 6C. Similarly to the above, a yellow light beam LY has an incidence opening angle of 75 degrees, and a cyan light beam LC has an incidence opening angle of 90 degrees. Then, the distance d1 in the main-scanning direction between the center of lens of an incident surface of the scanning lens 6Y for yellow and the center of lens of an incident surface of the scanning lens 6C for cyan is 1.398 mm, and the distance d2 in the optical axis direction is 0.983 mm. Such arrangement is for locating the axial point 6CA of the scanning lens 6C on the offset curved line A2.

The polygon mirror 4 is a hexagonal-prism shaped mirror, which has six incident surfaces, and has the bottom surfaces of an incircle with a diameter of 30 mm. Assume that distances on the optical axis between the polygon mirror 4 and the respective incident surfaces of the scanning lenses 6Y and 6C (lengths of the optical path Yd and the optical path Cd) is 23.7 mm, and distances on the optical axis between the respective emission surfaces of the scanning lenses 6Y and 6C and the circumference surfaces (scanned surfaces) of the photoreceptor drums 21Y and 21C is 120 mm.

Table 1 indicates surface shapes of the incident surfaces of the scanning lenses 6Y and 6C (R1 surface), and the emission surfaces of the scanning lenses 6Y and 6C (R2 surface).

TABLE 1

| | R1 surface | | | | R2 surface | | |
|---|---|---|---|---|---|---|---|
| Rm | −2.21E+01 | Rs0 | 8.76E+00 | Rm | −2.15E+01 | Rs0 | −6.82E+00 |
| Ky | −7.26E+00 | Kx | 0.00E+00 | Ky | −6.82E+00 | Kx | −5.92E−01 |
| A1 | 0.00E+00 | B1 | 2.61E−02 | A1 | −2.81E−03 | B1 | 4.82E−03 |
| A2 | 1.95E−03 | B2 | 2.47E−02 | A2 | 3.94E−03 | B2 | 1.37E−02 |
| A3 | 0.00E+00 | B3 | −5.96E−06 | A3 | 2.38E−06 | B3 | −2.23E−05 |
| A4 | 2.01E−06 | B4 | 1.89E−04 | A4 | 1.66E−06 | B4 | −2.12E−06 |
| A5 | 0.00E+00 | B5 | 4.12E−08 | A5 | −4.64E−10 | B5 | 2.21E−09 |
| A6 | −4.12E−10 | B6 | −4.54E−07 | A6 | −9.58E−11 | B6 | −7.95E−10 |
| A7 | 0.00E+00 | B7 | 4.50E−11 | A7 | 0.00E+00 | B7 | 3.13E−12 |
| A8 | 3.19E−14 | B8 | 1.13E−09 | A8 | 4.54E−14 | B8 | −7.51E−13 |
| A9 | 0.00E+00 | B9 | 0.00E+00 | A9 | 0.00E+00 | B9 | 0.00E+00 |
| A10 | 0.00E+00 | B10 | −7.65E−13 | A10 | 0.00E+00 | B10 | 1.97E−16 |

In Table 1, Rm is a main-scanning curvature radius, Rs is a sub-scanning curvature radius, Ky is a main-scanning conic coefficient, Kx is a sub-scanning conic coefficient, An (n is an integer) is a high-order coefficient of a surface shape in the main-scanning direction, and Bn (n is an integer) is a high-order coefficient of a surface shape in the sub-scanning direction.

The surface shapes of the R1 surface and the R2 surface are defined by a formula indicating the following sag amount using a local orthogonal coordinate system (x, y, z) assuming that a surface apex is an origin, the sub-scanning direction is x-axis, the main-scanning direction is y-axis, and directions toward the circumference surfaces of the photoreceptor drums 21Y and 21C is a positive direction of z-axis (optical axis direction). Where, Zm (main-scanning direction) and Zs (sub-scanning direction) are a displacement amount in z-axis direction (surface apex reference) at a position of height y, and the height y is a height in a direction perpendicular to the z-axis directional ($Y^2=x^2+y^2$).

$$Sag = z_m + z_s \quad \text{[Formula 1]}$$

$$z_m = \frac{C_m Y^2}{1 + \sqrt{1-(1+k_y)C_m^2 Y^2}} + \sum_{i=1}^{10} A_i Y^i$$

-continued $$z_s = \frac{C_s X^2}{1 + \sqrt{1 - (1+k_x)C_s^2 X^2}}$$

$$C_s = \frac{1}{R_s}$$

$$R_s = R_{s0} + \sum_{i=1}^{10} B_i Y^i$$

Figure 7:
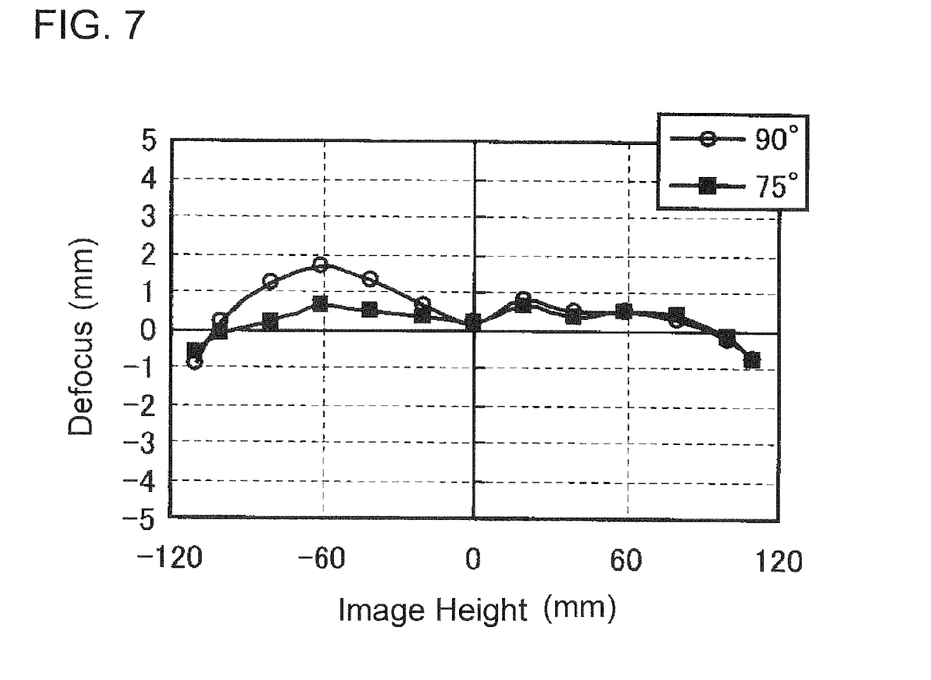
FIG. 7 is a graph indicating field curvatures of the scanning optical system according to the working example.

FIG. 7 is a graph indicating field curvatures in the main-scanning direction of the scanning optical system for yellow (incidence opening angle=75 degrees) and the scanning optical system for cyan (incidence opening angle=90 degrees) according to the working example. As described above, the light scanning device 23 is designed on the basis of the scanning optical system for yellow that has the incidence opening angle of 75 degrees. This ensures the excellent field curvature, which has around 0.5 mm or less over approximately all the image heights, caused by the yellow light beam LY. While the field curvature caused by the cyan light beam LC with the incidence opening angle of 90 degrees is slightly inferior in a negative image height region compared with the yellow light beam LY, the field curvature does not exceed 2 mm at maximum, which is practically negligible.

COMPARATIVE EXAMPLE

Figure 8:
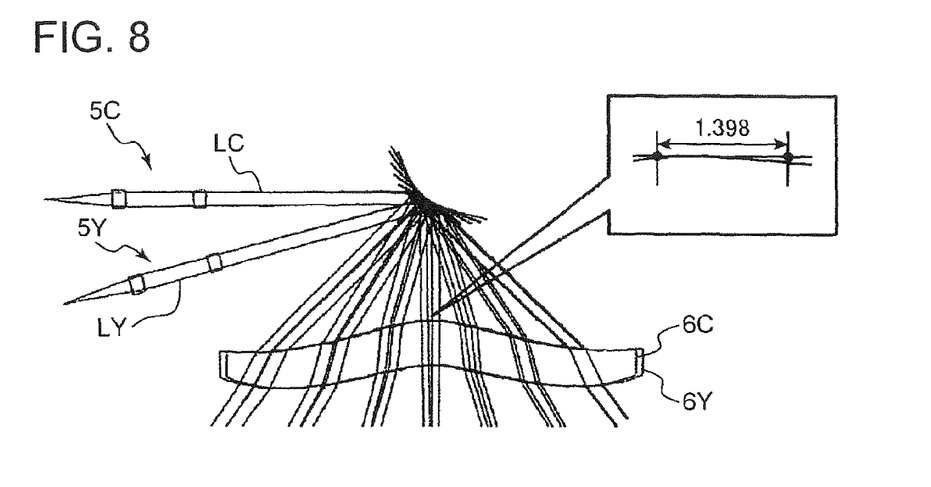
FIG. 8 illustrates a main-scanning cross section of a scanning optical system that includes the arrangement relationship between a first and a second scanning lenses according to a comparative example.

A combined scanning optical system of the scanning optical system for cyan and the scanning optical system for yellow, which are illustrated in FIG. 8 is for a comparison to the above-described working example. This scanning optical system is identical to the scanning optical system of the working example in that the scanning optical system includes the incidence optical systems 5Y and 5C, the one polygon mirror 4, and the scanning lenses 6Y and 6C, the yellow light beam LY has an incidence opening angle of 75 degrees, and the cyan light beam LC has an incidence opening angle of 90 degrees. Obviously, the surface shapes of the scanning lenses 6Y and 6C are identical to the surface shapes in Table 1. A scanning optical system of the comparative example is different from the working example in that positions in the main-scanning direction of the center of lens of the scanning lens 6Y for yellow and the center of lens of the scanning lens 6C for cyan are at different positions by the distance identical to the distance in the working example (d1=1.398 mm), and their positions in the optical axis direction are at the position identical to the position in the working example (d2=0). That is, the above-described aspect is an aspect where the axial point 6CA of the scanning lens 6C is not located on the offset curved line A2.

Figure 9:
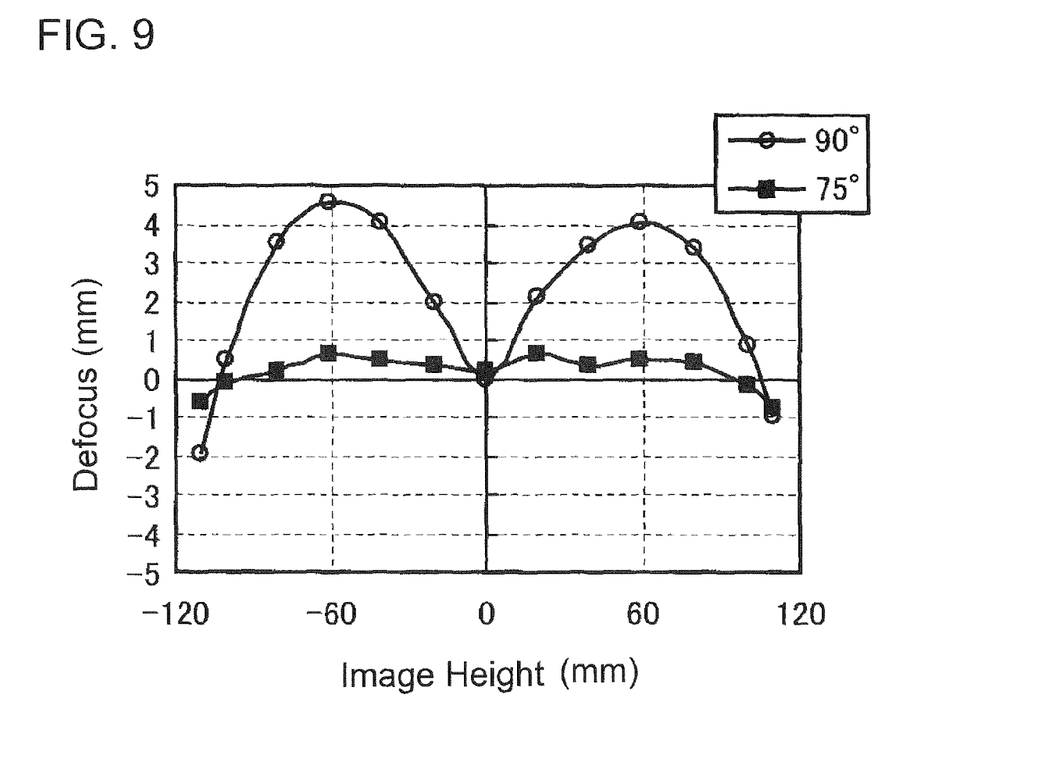
FIG. 9 is a graph indicating field curvatures of the scanning optical system according to the comparative example.

FIG. 9 is a graph indicating field curvatures in the main-scanning direction of the scanning optical system for yellow (incidence opening angle=75 degrees) and the scanning optical system for cyan (incidence opening angle=90 degrees) according to the comparative example. In the comparative example, the field curvature caused by the yellow light beam LY with the incidence opening angle of 75 degrees, similarly to working example, is an excellent field curvature, which has around 0.5 mm or less over the approximately all the image heights. However, mostly all the image heights of the field curvature caused by the cyan light beam LC with the incidence opening angle of 90 degrees, exceeds 2 mm except near the center of the image heights and near the end portions of the image heights. The image height near ±60 mm, in particular, exists a defocus that exceeds 4 mm, and this demonstrated that the required optical property was not satisfied.

Figure 10:
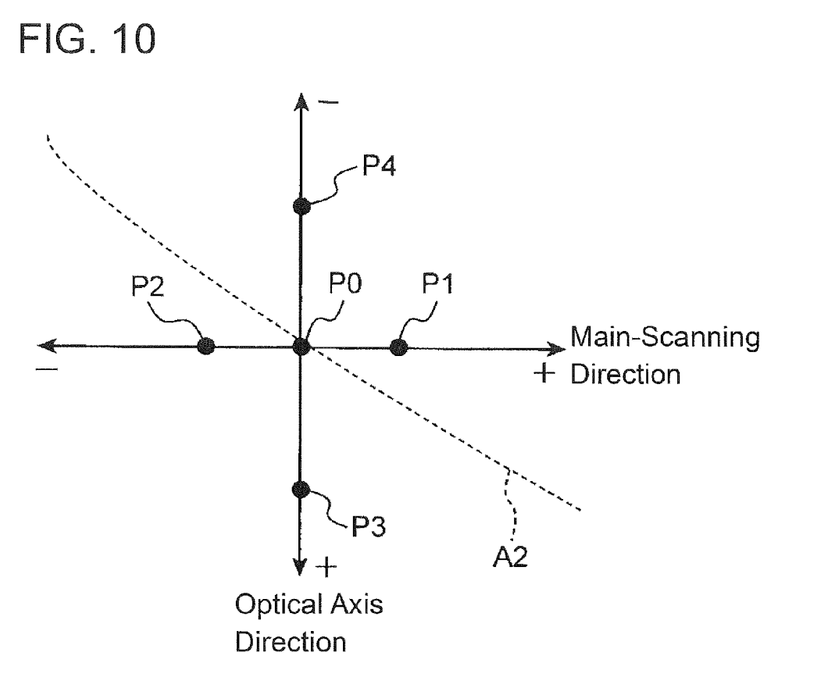
FIG. 10 illustrates a state where a position of the second scanning lens on an optical axis is slightly displaced from a offset curved line.

FIG. 10 illustrates a relation between positions P0, P1, P2, P3, and P4 of the center of lens of the scanning lens 6C (axial point 6CA), and the offset curved line A2. The above-described working example employs the scanning optical system that has the center of lens of the scanning lens 6C located at the position P0 on the offset curved line A2. On the other hand, the above-described comparative example employs the scanning optical system that has the center of lens of the scanning lens 6C located at the position identical to the position P0 in the main-scanning direction, and is located at a position significantly displaced by a distance of 0.983 mm in the optical axis direction.

While it is not preferred that the center of lens of the scanning lens 6C, as in the comparative example, be displaced from the offset curved line A2 by about 1 mm degree, the center of lens of the scanning lens 6C may be displaced from the offset curved line A2 by about 0.5 mm or less, especially by a range of 0.3 mm or less. The above respective positions are displaced by the following distance from the position P0: the position P1 is displaced by 0.1 mm in the main-scanning positive direction; the position P2 is displaced by 0.1 mm in the main-scanning negative direction; the position P3 is displaced by 0.2 mm in the optical axis positive direction; and the position P4 is displaced by 0.2 mm in the optical axis negative direction.

Figure 11:
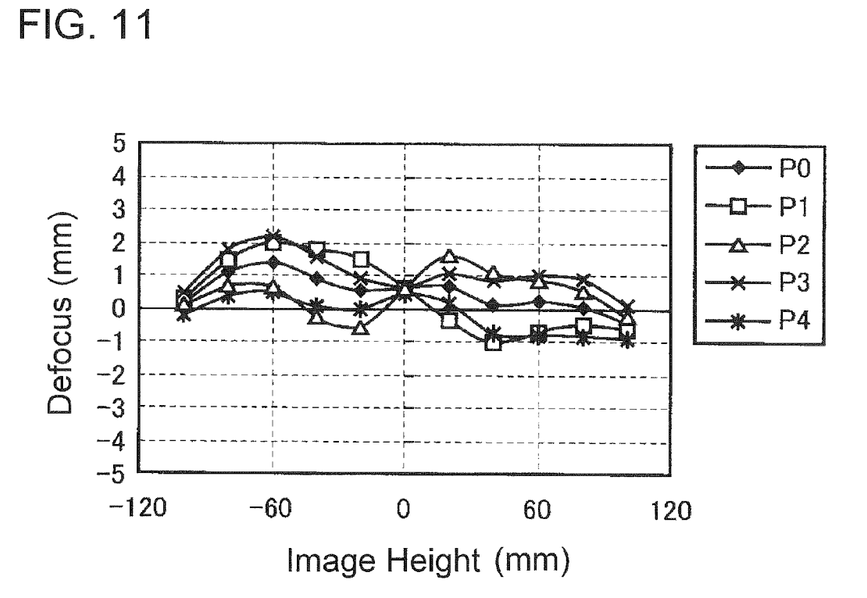
FIG. 11 is a graph indicating respective field curvatures when the position of the second scanning lens on an optical axis is located at respective positions P0 to P4, which are illustrated in FIG. 10.

The center of lens of the scanning lens 6C of the above-described working example is located at the respective positions P1, P2, P3, and P4, which are differently located from the position P0, to create four scanning optical systems. This determines field curvatures of the respective scanning optical systems. FIG. 11 is a graph indicating respective field curvatures of the scanning optical system when the center of lens of the scanning lens 6C is located at the respective positions P0 to P4 illustrated in FIG. 10. The graph plotted at the position P0 is identical to the graph of the incidence opening angle of 75 degrees in the above-described working example.

FIG. 11 shows the image height of the field curvature kept within 2.0 mm or less over all the image height even when the center of lens of the scanning lens 6C is located at the positions P1, P2, P3, or P4, which are positions different from the position P0. This consequently demonstrated the practical negligibility even when the position of the center of lens of the scanning lens 6C is displaced by the range of 0.3 mm or less from the offset curved line A2.

With the above-described light scanning device 23 according to the embodiment, the light scanning device 23 configured to have the two light beams with different incidence opening angles entering one deflection surface of the polygon mirror 4 ensures the improved optical performance of the light image formed on the scanned surface by these two light beams.

The above-described embodiment is one example, and the disclosure ensures employment of various modified embodiments. For example, while the above-described embodiment has described an example of the first incidence opening angle θ1 of 75 degrees and the second incidence opening angle θ2 of 90 degrees, this is merely one example. These θ1 and θ2 are appropriately determined corresponding to a layout design of the scanning optical system in the housing of the light scanning device 23.

While an incidence angle of a light beam, which enters the deflection surface 41, in the sub-scanning direction is not specifically limited, it is preferred that the incidence angle be approximately 90 degrees. This ensures a size in the sub-scanning direction, that is, a reduced size in the height direction of the housing of the light scanning device 23, which provides an advantage.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A light scanning device comprising:
a first light source that emits a first light beam;
a second light source that emits a second light beam;
a polygon mirror including a rotation shaft and a deflection surface, the deflection surface ensuring entering of the first light beam and the second light beam at an identical timing, the polygon mirror reflecting the first light beam and the second light beam to scan on a scanned surface in a main-scanning direction while rotating around the rotation shaft;
a first incidence optical system that causes the first light beam having a first incidence opening angle to enter the deflection surface;
a second incidence optical system that causes the second light beam having a second incidence opening angle to enter the deflection surface, the second incidence opening angle being different from the first incidence opening angle;
a first scanning lens located between the deflection surface and the scanned surface, the first scanning lens forming an image of the first light beam on the scanned surface; and
a second scanning lens that forms an image of the second light beam on the scanned surface,
wherein
reflection points of the first and the second light beams on the deflection surface at corresponding time points which each light beam passes through a position on an optical axis of each scanning lens are different locations in a rotating direction of the polygon mirror,
the first scanning lens is superimposed on the second scanning lens such that a first axial point which is located on a position on the optical axis of an incident surface of the first scanning lens and a second axial point which is located on a position on an optical axis of an incident surface of the second scanning lens are different locations in the main-scanning direction and an optical axis direction.

2. The light scanning device according to claim 1, wherein the second incidence opening angle is an incidence opening angle larger than the first incidence opening angle,
the first and the second scanning lenses are located such that in a plan view along an axial direction of the rotation shaft of the polygon mirror, the first and the second axial points are positioned on a circle locus.

3. The light scanning device according to claim 1, wherein the first scanning lens alone is a scanning lens between the polygon mirror and a first scanned surface, and the second scanning lens alone is a scanning lens between the polygon mirror and a second scanned surface, in the optical paths.

4. An image forming apparatus, comprising:
a first image carrier and a second image carrier that carry an electrostatic latent image; and
the light scanning device according to claim 1 that irradiates circumference surfaces of the first image carrier and the second image carrier as the respective scanned surfaces with the first light beam and the second light beam.

* * * * *